United States Patent [19]

Le Noane et al.

[11] Patent Number: 5,519,801
[45] Date of Patent: May 21, 1996

[54] SMALL, HIGH PRECISION, MULTICORE OPTICAL GUIDES AND PROCESS FOR THE PRODUCTION OF SAID GUIDES

[75] Inventors: Georges Le Noane, Tregastel; Philippe Grosso, Servel; Isabelle Hardy, Louannec, all of France

[73] Assignee: France Telecom Etablissement Autonome De Droit Public, Paris, France

[21] Appl. No.: 191,990

[22] Filed: Feb. 4, 1994

[30] Foreign Application Priority Data

Feb. 15, 1993 [FR] France ............................. 93 01674

[51] Int. Cl.⁶ ................................................. G02B 6/04
[52] U.S. Cl. ................................................. 385/115
[58] Field of Search ........................ 385/115; 65/403, 65/408, 437

[56] References Cited

U.S. PATENT DOCUMENTS

| | | |
|---|---|---|
| 4,444,463 | 4/1984 | Schneider et al. . |
| 4,978,377 | 12/1990 | Brehm et al. . |
| 4,984,859 | 1/1991 | Fujigaki et al. ............ 385/115 |
| 5,208,890 | 5/1993 | Kohler et al. ............ 385/115 |

FOREIGN PATENT DOCUMENTS

| | | |
|---|---|---|
| 0089498 | 9/1983 | European Pat. Off. . |
| 0215674 | 3/1987 | European Pat. Off. . |
| 0372450 | 6/1990 | European Pat. Off. . |
| 0519834 | 12/1992 | European Pat. Off. . |

OTHER PUBLICATIONS

Patent Abstracts of Japan—60154205—vol. 9, No. 329—Dec. 24, 1985—Aug. 13, 1985.

Patent Abstracts of Japan—61251534—vol. 11, No. 101—Mar. 31, 1987—Nov. 8, 1986.

*Primary Examiner*—Rodney B. Bovernick
*Assistant Examiner*—Robert E. Wise
*Attorney, Agent, or Firm*—Pearne, Gordon, McCoy & Granger

[57] ABSTRACT

Small, high precision, multicore optical guides and process for the production of said guides. Such a guide includes elementary guides (G1 to G4) and a matrix (M) in which they are located. These elementary guides are very accurately positioned with respect to one another in the matrix and with respect to the external contours (5) thereof and have high precision geometrical characteristics. According to the process, manufacturing and machining of the blanks so as to obtain, after assembly, the chosen geometrical model for the multicore guide. They are assembled in accordance with this model, welded together by means of a bait and the assembly is drawn.

14 Claims, 5 Drawing Sheets

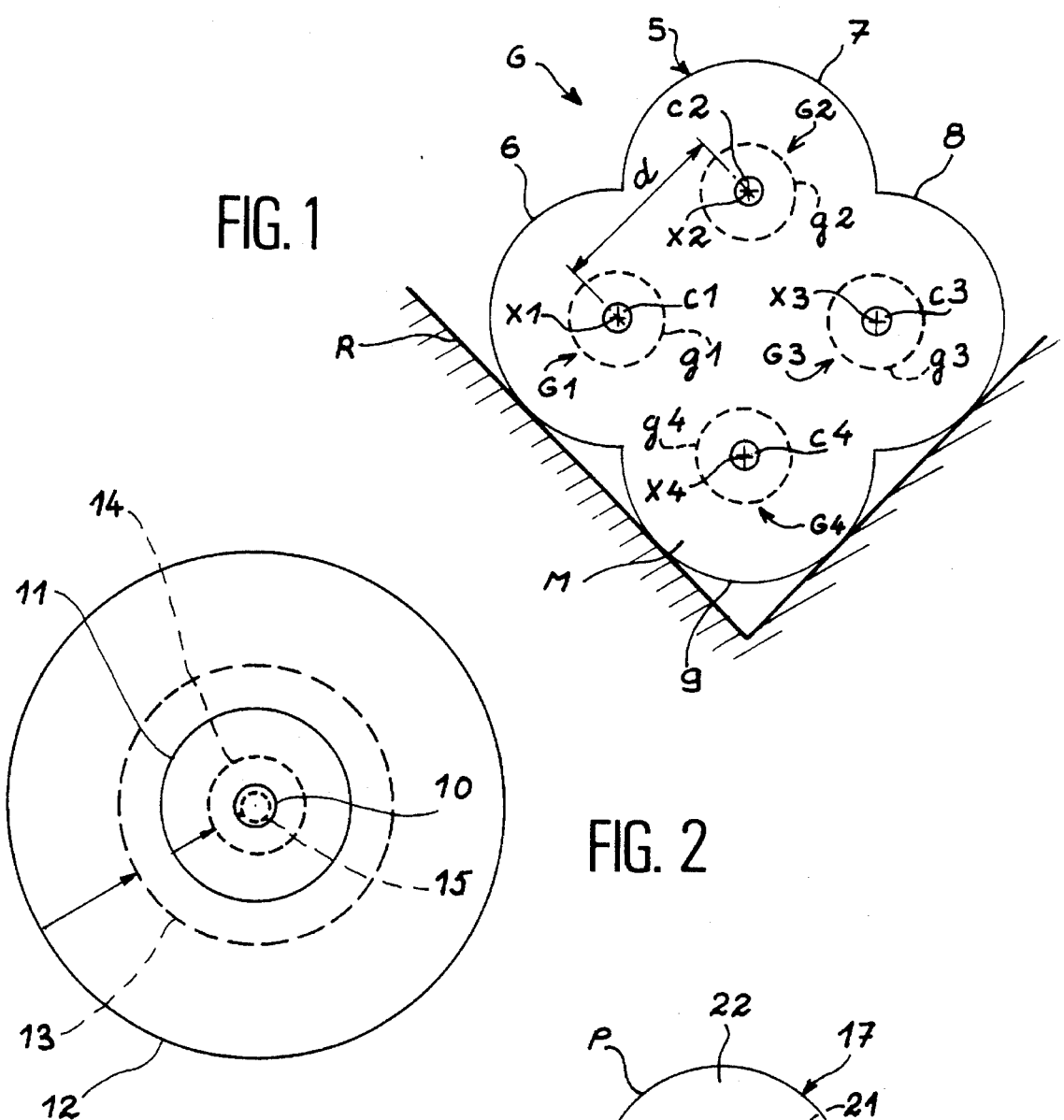
FIG. 1
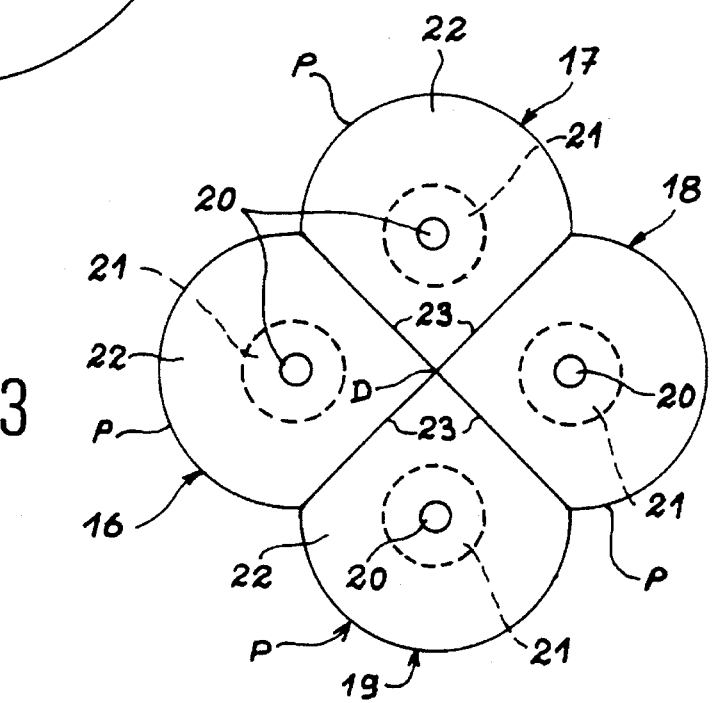
FIG. 2
FIG. 3

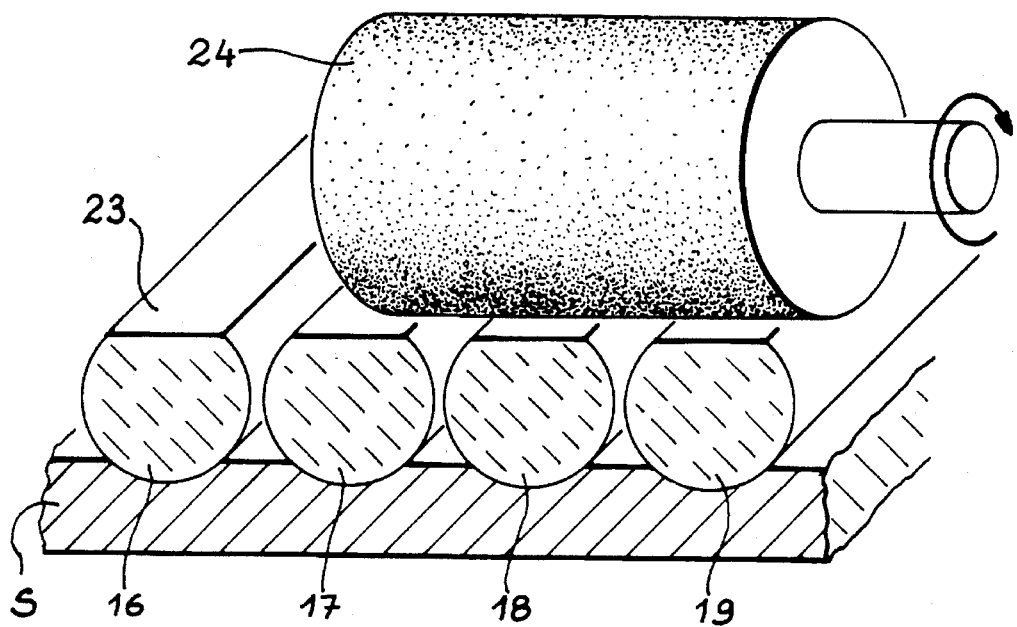
FIG. 4
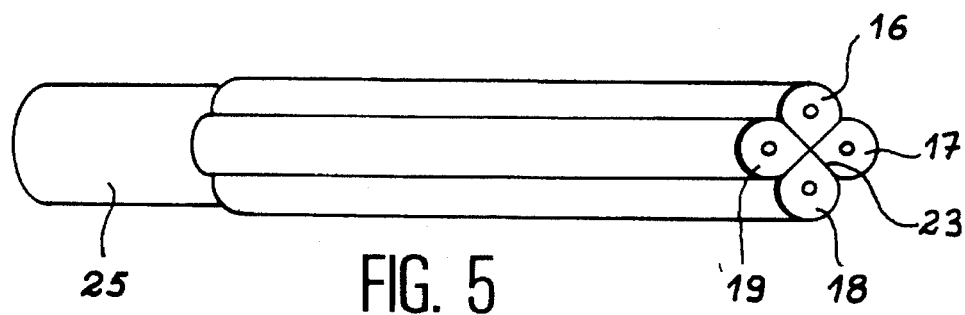
FIG. 5
FIG. 6
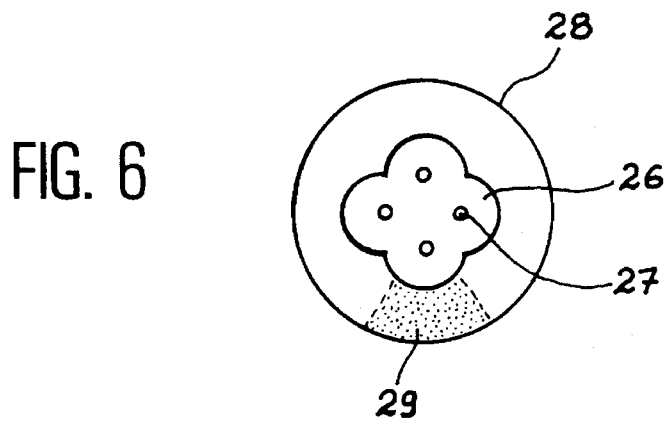

SMALL, HIGH PRECISION, MULTICORE OPTICAL GUIDES AND PROCESS FOR THE PRODUCTION OF SAID GUIDES

BACKGROUND OF THE INVENTION

The present invention relates to small, high precision, multicore optical guides and to their production process.

The present invention more particularly applies to the production of very economic, monomode, optical guides, but can also be applied to the production of multimode optical guides.

Certain types of multicore optical guides are already known from the following documents:

"High density multicore-fibre cable": S. Inao and Al. in Proc. 28th int.—Wire and cable symp.—November 1978.

"New type of multicore fibre"—Proc. DFC—April 1982: N. Kashima and Al.

"Analysis and experiments with crosstalk between adjacent graded-index optical fibres"—J. lightwave Technol.—Vol. LT3—August 1985.

In addition, FR-A-2,510,545, entitled "Process for the preparation of a multiple optical fibre" describes a means for drawing elementary cylindrical blanks in order to group them in an assembly of elementary optical fibres by filling the spaces between the fibres by introducing an intermediate liquid material consisting of at least one compound chosen from among the oxides forming glassy networks, oxides modifying glasses and intermediate oxides. This process is intended to prevent the formation of bubbles on drawing.

FR-A-2,551,881 and FR-A-2,551,885 describe processes for the production of a multicore optical fibre, particularly by the partial, but directional disappearance of the core of the blank, thus making it possible to separate the two cores of the future optical fibre.

These documents either only describe the principle of multicore guides and in particular multimode multicore guides, or stress the disadvantages of said guides with regards to marking and precision without obviating these disadvantages, or describe processes leading to a simple assembly of fibres, which in no way solves the problem of the great accuracy necessary for connecting these guides under economic conditions, the problem of marking or registration and the problem of obtaining a limited size leading to a maximum densification, or describe processes which lead e.g. to two cores in a small volume, but in no way lead to guides of high quality and with the necessary geometrical precision.

None of these documents leads to easily markable, high precision multicore guides, with a view to a simple and effective connection, or having small dimensions in order to bring about a real densification of optical fibre cables e.g. usable for transmitting information to subscribers of a telecommunications network.

SUMMARY OF THE INVENTION

The object of the invention is to obviate these disadvantages. It relates to high precision multicore optical guides and to their production process.

More specifically, the present invention relates to a multicore optical guide, characterized in that it comprises:

a plurality of elementary optical guides, whose axes are parallel and which in each case have a core and an optical sheath surrounding said core and a matrix containing said elementary optical guides, and in that said elementary optical guides are positioned very accurately at positions defined to within a few tenths of a micrometer with respect to one another in the matrix and with respect to the outer contours thereof and have high precision geometrical characteristics, the core diameter and the diameter of the optical sheath of said elementary guides being defined to within a few tenths of a micrometer and the offset between said core and said sheath being approximately $\frac{1}{10}$ micrometer.

The elementary optical guides can be monomodal, the multicore guide then being said to be "monomode".

The contours of the multicore guide permit an easy marking or registration for an identification in space of the elementary optical guides.

The multicore guide according to the invention can be produced with dimensions well below those obtained with a number of optical fibres equal to the number of elementary guides of the multicore guide.

It is also possible to optimize the geometrical characteristics of the elementary guides and position them so that the multicore guide has very small dimensions and the optical coupling of said multicore guide with a similar guide is minimized so as not to be prejudicial during use with high or low bit rate transmission systems, over distances of the type encountered in optical subscriber networks.

The multicore optical guide according to the invention thus brings about a considerable densification compared with an elementary assembly of optical fibres (in the same number as the cores of the multicore guide), whilst making it possible to establish very high quality optical links, which has the consequence of reducing the cost of each elementary guide compared with the cost of an optical fibre, whilst considerably reducing the costs of cables, their laying and the associated civil engineering.

The multicore optical guide according to the invention also makes it possible, by the great accuracy of the distances between the elementary guides and the great accuracy of the positioning of said guides with respect to the outer contours of the multicore guide, a simple marking and a very simple positioning in a reference system, which permits a connection of two multicore guides in a very efficient manner, i.e. with acceptable losses on connection for subscriber networks, said connection also being very economic because there is no need for any intermediate adjustment and the indispensable operations such as the stripping of the guide, the cutting of the guide and the putting into place in the alignment reference system take place for all the cores of the multicore guide.

The multicore guide according to the invention can comprise four elementary optical guides, whose axes form, in cross-section, the corners of a square, the contours of the matrix forming four identical portions of cylinders of revolution, whose axes respectively coincide with the axes of the elementary optical guides.

Each elementary optical guide of the multicore guide according to the invention can be monomode.

The present invention also relates to a process for the production of a multicore optical guide according to the invention, said process being characterized in that it comprises the following successive stages:

a plurality of high precision, elementary blanks is produced, said precision being compatible with that which is required for the multicore guide, said elementary blanks are machined with great accuracy and so as to obtain, following the assembly of these blanks, the chosen geometrical model for the multicore optical guide, the thus machined elementary blanks are assembled in accordance with the chosen geometrical model, the machined and assembled elementary blanks are partly welded by means of a bait and a very high precision drawing takes place of the assembly of the elementary blanks provided with the bait in order to obtain the multicore optical guide.

In order to obtain a very small multicore guide, elementary blanks with optimized dimensions are produced and are compatible with those which are required for the multicore guide. To do this, it is appropriate to use a very precise blank production process. Thus, use is e.g. made of the process described in EP-A-519,834 entitled "Process and apparatus for the production of blanks for optical fibres" (cf. also French patent application 9,107,669 of 21.6.1991).

Thus, according to a special embodiment of the process according to the invention using the process described in the above document, each elementary blank is produced according to a process involving the following stages:

a thick-walled, silica hollow bar with a very high geometrical precision is produced, using a furnace an internal vapour phase deposition takes place of a vitreous coating in said bar, with the aid of a mixture of gaseous compounds circulated within the bar, these compounds being able to produce the coating by reacting with one another and the bar is reduced.

In the process described in the above document, the nominal, internal and external diameters of the hollow silica bar are known and accurate to within a tolerance less than 0.01 mm.

As a result of the deposition which takes place in a very homogeneous manner and also the regular and homogeneous reduction process, the blank obtained is of very great regularity and very high accuracy, particularly with regards to the precise and regular external diameter and the concentricity of the deposited core and deposited optical sheath compared with the external sheath.

Provided that for the hollow bar use is made of a silica having an adequate quantity, e.g. a high quality, synthetic silica, the advances made in this field also make it possible to optimize the size of the guide obtained by drawing the blank or, expressed in another way, the deposited volume, so that the guide obtained has a very good quality with a ratio between the diameter of the deposited optical sheath and the diameter of the core reduced to a value of approximately 3, whereas it is 5 to 6 in the case of a conventional monomode fibre.

This means that for the final fibre obtained from such a blank, in the standard 125 µm external diameter diagram, the core of the monomode guide represents approximately 8 µm (as in a conventional monomode fibre) and the optical sheath approximately 24 µm in place of 40 to 50 µm in a conventional fibre.

The process according to the invention takes account of the considerable advances likely to supply high precision cylindrical blanks for the external diameter and for the concentricity of the core and sheath obtained by the process described in the aforementioned document or by any other process able to supply the same degree of precision for such blanks, but uses a supplementary optimization aiming at producing very high accuracy blanks with dimensions adapted to the aims of the present invention, namely the production of very small, multicore optical guides.

Thus, the elementary blanks produced in the process according to the invention will have geometrical characteristics adapted to the minimum necessary for producing multicore guides. In the above example, the diameter 24 µm sheath is surrounded by a silica thickness leading to a diameter of 125 µm, i.e. 3.7% of the volume of the fibre.

It is known that these standardized dimensions of the fibre are conditioned by a number of elements including the resistance of the fibre to bending and microbending, the mechanical strength and the attenuation.

In addition, a number of factors intervene in the cost of producing very economic subscriber networks, namely the costs of the fibre and cable and obviously the civil engineering and laying costs. Conversely, taking account of the small transmission distances, the extremely small attenuation of the fibre is not a determining criterion.

The invention aims at defining a novel optical guide and at optimizing the densification and unit cost parameters of this guide, (which is preferably monomodal).

In the invention, the proportions of the elementary blanks are chosen so that they are compatible with the required multicore guide and the optogeometrical parameters of the elementary guides (core diameter, difference between the optical index of the core and that of the optical sheath) are chosen so as to optimize their behaviour in the desired multicore guide (reduction of crosstalk, sensitivity to bending and microbending, sought attenuation, etc.).

Thus, the process according to the invention includes the production of high precision blanks, but having optimized optogeometrical characteristics and dimensions in order to bring about elements of the desired multicore optical guides.

Thus, the blanks obtained can be, bearing in mind their high geometrical precision, machined with a very high accuracy, in accordance with an arrangement conforming with the desired multicore optical guide model, followed by assembly, prewelding and drawing with great precision.

The machining and assembly of these blanks thus constitute two essential stages of the process for obtaining the desired dimensions and shapes for the elementary blanks and for obtaining an assembly of blanks with very accurate dimensions guaranteeing a high precision drawing and therefore the obtaining of a high precision multicore guide.

According to a special embodiment of the process according to the invention, the machining of each elementary blank comprises the formation thereon of one or more flats parallel to the axis of said elementary blank, permitting the assembly of the elementary blanks in accordance with the chosen geometrical model.

In another special embodiment, production takes place of four identical elementary blanks, on each of them are formed two identical, perpendicular flats, which have a common line and which define a cylinder of revolution portion around the axis of said elementary blank, so that the latter admits a plane of symmetry containing the axis of said elementary blank and the line common to the two blanks and the four, thus machined, elementary blanks are assembled in order to form an assembly in which the four axes of the elementary blanks occupy, in cross-section, the tops of a square, and whereof the contours form four portions of a cylinder of revolution, whose axes respectively coincide with the axes of the elementary blanks.

Preferably, the assembly is provided with a protective coating during its drawing. Also preferably, said protective coating is provided with a means for marking the elementary optical guides of the multicore guide formed.

BRIEF DESCRIPTION OF THE DRAWINGS

The invention is described in greater detail hereinafter relative to non-limitative embodiments and with reference to the attached drawings, wherein show:

FIG. 1 a diagrammatic view of a cross-section of an example of a very small, high precision multicore optical guide according to the invention, provided with four elementary optical guides.

FIG. 2 a diagrammatic view of a cross-section of an elementary blank on which are carried out the optimizations of the different volumes necessary for obtaining a very small, high precision multicore guide according to the invention.

FIG. 3 a diagrammatic view of a cross-section of an assembly of four elementary blanks for producing a guide having four cores with a very high precision and of very small size according to the invention.

FIG. 4 a diagrammatic view illustrating the operation of machining a very precise flat on the four elementary blanks for producing a guide with four cores of very high precision and very small dimensions according to the invention.

FIG. 5 diagrammatically an assembly of four elementary blanks provided with a bait welded to said assembly of blanks.

FIG. 6 a diagrammatic view of a cross-section of a very small, high accuracy multicore optical guide according to the invention, after drawing, said guide being coated with a polymer material and provided with a marking means.

DETAILED DESCRIPTION OF THE PREFERRED EMBODIMENTS

Figure 7:
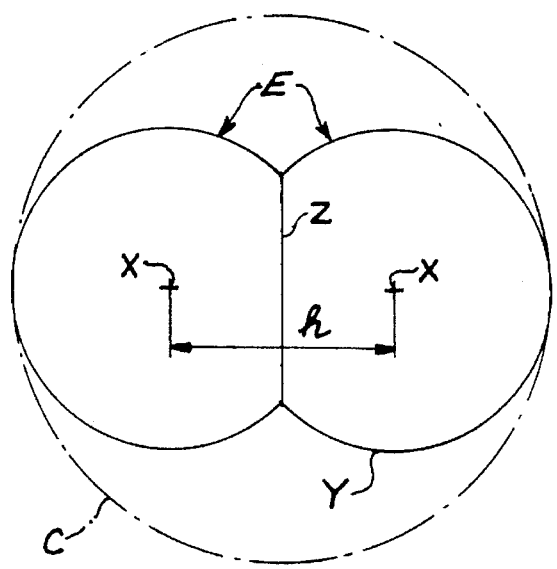
FIGS. 7, 8, 9, 10, 11, 12, and 13 diagrammatic views of cross-sections of multicore guides according to the invention.

FIG. 1 diagrammatically shows a very small, high accuracy multicore guide representing an example of the multicore guide according to the invention.

The multicore optical guide G shown in FIG. 1 comprises n elementary optical guides G1, G2, G3, G4 (n=4 in the example shown) having in turn respectively four cores c1, c2, c3 and c4, said cores being respectively surrounded by optical sheaths g1, g2, g3 and g4.

The axes of the cores c1, c2, c3 and c4, which respectively carry the references X1, X2, X3 and X4, are parallel and also constitute the axes of the elementary guides.

The multicore guide G also comprises a matrix M in which are located the elementary guides.

In the example shown, the axes X1, X2, X3 and X4 form, in cross-section, the corners of a square and the contours 6,7,8 and 9 of the matrix M, which also constitute the contours of the multicore guide G, are respectively associated with the elementary guides and form four identical portions of cylinders of revolution, whose axes respectively coincide with the axes X1, X2, X3 and X4.

The cores c1, c2, c3 and c4 are at known, precise distances from one another, said precision being given by the manufacturing process according to the present invention.

For example, the cores are positioned from one another at distances known with an accuracy of approximately 1/10 micrometer or a few tens of a micrometer, said difference resulting from the quality of the drawing operation between the basic blank and the production of the very small size multicore optical guide. For example, such a multicore guide has distances d between the cores of approximately 50 μm.

These cores are positioned very accurately with respect to the reference system 5 of the multicore guide and which is formed by cylinder portions 6,7,8 and 9.

The radius of these cylinders is precise (precision of a few tenths of a micrometer) the cores being perfectly "centered" on the respective axes of said cylinders.

The overall dimensions of such an optical guide G are accurate to within a few tenths of a micrometer, ensuring with the centering of the cores with respect to the elementary cylinders, a very precise positioning of the core relative to the reference system 5 forming the external surface of the guide. For example, such an optical guide with four cores has overall dimensions of approximately 125 μm.

Thus, the matrix M of the guide G can be simply applied to a reference system R constituted by two surfaces which are e.g. perpendicular, so that the cores are perfectly registered or referenced in space and so that the cores can consequently be positioned either facing another similar multicore guide for a rapid, effective and economic connection of the two multicore guides, or an array of optoelectronic elements such as light-emitting diodes, laser diodes or photodiodes, with a view to the coupling of the elementary guides to said elements.

Thus, bearing in mind the very small dimensions and simple marking associated with the high positional accuracy of the elementary guides, it is a question of an extremely economic multicore guide making it possible to produce extremely dense and therefore very economic optical cables, very economic connections and greatly reduced laying and civil engineering costs.

FIG. 2 shows in continuous line form the proportions of a blank making it possible to produce a standard monomode fibre.

Arrows and dotted lines indicate the transformations made to the blank and permitting the production of the multicore guide.

In the standard blank it can be seen that for a core 10 of radius (a) the deposited, very high quality silica portion forming the optical sheath 11 has a radius of (5a) to (6a) and the external surface 12 of the blank a radius of approximately (15a).

These characteristics, to which it is necessary to add data such as an optical index difference between the core and the sheath of approximately $5 \times 10^{-3}$, offer the fibres from said preforms excellent attenuation characteristics both at 1.3 μm and at 1.55 μm, said characteristics being close to the ultimate attenuation due to Rayleigh scattering, and a good behaviour of the fibres with respect to bending and microbending phenomena, which makes them very easy to cable and enables them to retain intrinsic attenuations after installation.

Each primary blank produced during the first stage of the process according to the invention has characteristics which are significantly modified in order to optimize the production of the multicore guide from the densification and cost standpoints.

The main optimizations thus relate to the following points:

1) The reduction of the external diameter or diameter of the external surface 12, in order to bring it to the strict minimum 13 compatible with the overall behaviour of the multicore guide with respect to bending and microbending phenomena. For example, for a four core guide, it is possible to reduce the external diameter to proportions of (7a) to (8a). This reduction of the proportions of the external diameter leads to a significant economy, because in this way a monomode guide is obtained and not a monomode fibre with four times less material.

In other words, for a blank of size equivalent to a conventional blank, the productivity in connection with the production of a monomode guide is increased by four.

2) The reduction of the diameter of the sheath 11 in order to optimize it to its strict minimum 14 compatible with the core diameter and its optical index difference and obviously compatible with the quality of the material forming the outer part of the preform.

The advances made in this field have shown that with the use, for the outer portion, of an adequate quality synthetic silica (e.g. a silica whose attenuation does not exceed a few decibels/km at 1.5 µm or which does not contain too many OH$^-$ ions), it is possible to obtain small attenuations for the monomode guide, typically below 0.4 dB/km at 1.3 µm and 0.3 dB/km at 1.55 µm, for a deposited sheath radius of approximately (3a).

This reduction of the deposited sheath has the direct consequence of lowering costs, because the material deposited for producing the core and optical sheath is very pure and relatively expensive and because, as a result of this volume reduction, as a function of the deposition process used, it is possible to produce larger capacity and therefore more economic blanks.

3) The optimization of the core 10 of the guide both as regards the material (passage to a smaller diameter core 15) and for the optical index difference with the optical sheath.

Thus, the reduction of the external diameter, even taking account of the "insertion" of the guide in a multicore guide, has the consequence of increasing the sensitivity of the guide to bending and microbending phenomena and it is therefore desirable for the production of multicore guides to optimize the guide by increasing the optical index difference and reducing the core diameter.

This has the effect of very slightly increasing the intrinsic attenuation of the guide due to the supplementary incorporation of the dopant, but this attenuation value at a few hundredths dB/km, is not prejudicial for the sought application and has the double advantage of very significantly reducing the sensitivity of the guide to bending and microbending, whilst reducing the deposited material quantity, because the ratio of the sheath radius to the core radius remains approximately 3, and by offering densification perspectives for producing multicore guides.

For example, a conventional monomode fibre with zero scattering at 1.3 µm has a core of approximately 8.2 µm with a sheathcore index difference of approximately $5 \times 10^{-3}$, these values clearly only being given for information, optimization taking place as a function of the desired multicore guide.

4) Finally, within the scope of producing multicore guides according to the invention, each elementary blank has extremely precise geometrical characteristics, which means a regular deposition leading to a regular, precise core 15, to a regular and precise sheath 14 and to an external diameter 13 having an accurate, nominal known size, e.g. to within $\frac{1}{100}$ mm, for elementary blanks of 10 to 30 mm.

Obviously, for productivity reasons, the precise elementary blanks intended for producing the multicore guide can be drawn from very large diameter blanks having the capacity to produce monomode guides of several hundred kilometers.

FIG. 3 diagrammatically shows an assembly of 4 elementary blanks 16,17,18,19 for producing a guide having 4 cores of very high precision and very small dimensions.

Each elementary blank 16,17,18,19 is constituted by a core 20 and an optical sheath 21 ensuring the quality of the optical guide, as well as an external sheath 22 made from a silica which is less pure than the part constituted by the core and the optical sheath, but having an adequate quality to permit the optimization of the optical sheath diameter 21, e.g. to bring it to a ratio of 3 between the optical sheath diameter and the optical core diameter.

The assembly of the four external sheaths 22 leads, after drawing the assembly shown in FIG. 3, to the matrix M shown in FIG. 1.

The dimensions of each elementary blank are extremely precise and in particular the nominal external diameter of each elementary blank is accurately known and its tolerance is very small, particularly below $\frac{1}{100}$ mm for a diameter 30 mm blank.

The ratio of the external diameter to the core diameter is reduced compared with a blank intended to produce a conventional monomode fibre in order to optimize the final dimensions of the multicore guide according to the invention.

In the production process according to the invention and as shown in FIG. 3, the elementary blanks are machined in order to produce on each of them the two flats 23 necessary for producing the 4 core optical guide. These two flats 23 are identical and parallel to the axis of the corresponding elementary blank (core axis of said blank) and are also perpendicular to one another, have a common line carrying the reference D in FIG. 3 and define a cylinder of revolution portion P around the axis of the corresponding elementary blank, so that the latter admits as the plane of symmetry the plane containing said axis and the common line D.

The assembly of the 4 machined blanks shown in FIG. 3 leads, after drawing, to the guide G of FIG. 1.

In the case of a guide having two cores, a single flat is produced on each elementary blank prior to assembly.

Thus, as a function of the desired assembly method for the elementary blanks in order to form the very accurate multicore guide, by machining the flats to extremely precise dimensions compared with the external reference cylinder of each elementary blank and therefore the core of each elementary blank, said core is obtained in perfectly centered manner in the elementary blank corresponding thereto.

The dimensions of these flats is perfectly predetermined in order to form the desired assembly and it obviously also determines the distance between the cores 20 in this assembly, said distance being determinative in the construction of the multicore guide both for the geometrical accuracy of the elementary guides with respect to the external diameter references and for the characteristics of the guides with regards to crosstalk, i.e. the possibility of energy coupling between individual elementary optical guides.

Thus, it can be seen that the aim of minimizing crosstalk of elementary guides, whilst maintaining small dimensions leads to an optimization of all the parameters of the elementary blanks 16,17,18,19 and in particular the optimization of the external diameter/diameter ratio of the core, the optical sheath/core diameter ratio, the diameter of the core, the difference of the optical index between the core and the optical sheath, etc.

Thus, the phenomenon of crosstalk between the elementary guides is directly linked, inter alia, with the ratio of the distance between the cores and the radius of the cores. As an example of this ratio, beyond 12, it only induces very small crosstalk losses, which become perfectly acceptable for producing telecommunications links.

Thus, if it is wished to obtain the maximum density from the standpoint of the cores, the optimization consists of reducing the core diameter in order to obtain an adequate ratio, or increase, if said core diameter reduction becomes difficult, the distance between the cores in order to respect small crosstalk losses. For example, a guide optimized with a diameter of 7 µm leads to a minimum distance of 42 µm between the cores of the multicore guide according to the invention.

FIG. 4 diagrammatically shows the operation of machining 4 elementary blanks 16,17,18,19 mounted on an appropriate support S in order to produce flats.

By means of a grinding operation using a wheel 24, followed by a smoothing operation, a surface is obtained having an excellent planeity and a very good surface state, silica lending itself particularly well to these machining operations, which can be automated and generalized for a large number of elementary blanks and are therefore very inexpensive on relating the cost of such an operation to the number of kilometers of monomode guides produced by a production process according to the invention.

This high accuracy machining permits the production of cylindrical elementary blanks provided with flats 23 very precisely positioned with respect to the centres of the cores.

Thus, these machining operations then make it possible to obtain an assembly of n elementary blanks, as is shown in FIG. 3, where n=4, with an excellent geometry defined e.g. to within less than 1/100 mm, both for the dimensions of the external diameters of the blanks and for the precision of the flats with respect to the centres of the blanks.

FIG. 5 shows the assembly of the elementary blanks 16,17,18,19 after producing their flats 23 and the welding of a silica starting part 25, which has two essential functions, namely on the one hand linking the n elementary blanks (4 blanks in the present example) after pressing them against one another and on the other it starts at the time of drawing, in order to minimize the starting losses for the blank to n waveguides with a melting which propagates along the assembly during the drawing operation.

The drawing of the blank (assembly of FIG. 5) for giving a guide with n cores takes place with conventional drawing means leading to very high precision optical fibres.

FIG. 6 diagrammatically shows a cross-section of the optical guide 26 having four cores 27 of high accuracy and very small dimensions obtained by a production process according to the invention, following the machining of the elementary blanks, assembly, prewelding and high accuracy drawing.

Drawing can take place in accordance with a known optical fibre procedure and this very high accuracy can be obtained all the more easily if the blank to be drawn is itself very precise and regular.

The production process according to the invention leads to an assembly of machined elementary blanks with a very high accuracy and the precision of the multicore optical guide according to the invention is therefore very closely linked with the high drawing precision.

Thus, the assembly leads to an overall dimensional accuracy of approximately 1 to 2/100 mm which, on the scale of transformation due to drawing passing from an assembly of blanks of 40 to 60 mm to a multicore guide of 120 to 150 µm, leads to an intrinsic precision on the position of the guides better than 0.1 µm. The quality of the traditional fibre formation of ±2 µm can, in the case of very regular and very accurate blanks, be increased to ±0.5 µm.

Thus, it is with this combination of an extremely regular blank and very precise fibre formation that it is possible to expect a precision of approximately 0.5 µm on the positioning of the guide, which leads to a very precise multicore guide having the necessary characteristics for an easy marking and e.g. a connection of two multicore optical guides which is simple, inexpensive and sufficiently efficient within the scope of a use of such guides for subscriber networks or networks extending over short distances.

During the drawing operation, the multicore optical guide is coated with a plastic protective coating 28 having a thickness of a few dozen micrometers, typically 30 to 50 µm, and in order to facilitate the marking of the elementary guides 27 in the matrix 26, one side of said matrix is provided with a marking means incorporated into the coating 28.

In a specific embodiment, said marking takes place by a directional injection of a coloured resin 29 equivalent to the resin from which the coating 28 is formed. Thus, the mere fact of marking the coloured part gives the position of the matrix in space.

Thus, the present invention defines a multicore guide (its cores being preferably monomodal), said guide having a very high precision and very small dimensions.

In this multicore guide, the elementary guides are at known and very precise distances from one another and they are also very precisely referenced with respect to a reference system constituted by the outer surface of the multicore guide, which permits an easy centering of said guide in a simple reference system in order to ensure either a guide-to-guide coupling which is simple, effective and inexpensive, or an automatic alignment with respect to an assembly of optoelectronic emission or detection components.

According to the production process according to the invention, very high precision elementary blanks are produced with optogeometrical parameters adapted to the constitution of the multicore guide. These very precise elementary blanks are then machined in order to obtain flats with a very high precision permitting an assembly of the blanks in order to form a high precision matrix which, when prewelded with a starter, will be drawn in order to obtain a very high precision multicore guide.

The optimization of the optogeometrical parameters of each elementary guide thus leads to a considerable reduction in the cost of the preferably monomodal elementary guide.

The known notion of the monomode optical fibre is replaced here by the notion of the monomode elementary guide.

The process according to the invention is extremely economic because the very conventional machining operation can be generalized and automated, whilst still being fast and precise as silica lends itself well to these operations.

In this way it is possible to obtain a guide having n cores, in which n can range between 2 and at least 7 (6 cores at the top of a hexagon and a core in the centre of said hexagon when the guide is seen in cross-section), whilst maintaining very small dimensions for the guide. This means a considerable densification of existing optical fibre cables and therefore a very significant reduction in costs not only for the cable, but also for its laying, civil engineering and installation, with in particular a guide-to-guide connection possibility, which generalizes the conventional expensive phases of stripping the fibre, breaking, cleaning and alignment.

Therefore the present invention offers a new way for subscriber networks, particularly in the telecommunications field, where existing use difficulties with respect to monomode fibres lead to a sharing of one monomode fibre between n subscribers in order to make economies, which leads to complications in the associated electronic means, to the use of high performance components, the possible addition of devices such as optical amplifiers, the use of optical couplers 1 to n which are relatively costly to use.

Therefore the invention introduces the use of monomode guides for subscribers, either a single guide with the use of a simple component for full duplex connection, or n guides, which introduces to a certain extent the notion of a single monomode guide per use, the monomode guide being, as a result of the invention, very inexpensive to produce and use on the network.

This approach implies, conversely to the sharing approach, technical research on inexpensive, integrated, optoelectronic components which can be adapted to the evolution of needs and using a monomode guide according to the invention.

The performance of the invention will now be described. Preferably, to obtain a small size multicore guide according to the invention, the ratio of the optical sheath diameter to the diameter of the core of each elementary optical guide of said multicore guide is approximately 3. To achieve this, the ratio of the optical sheath diameter to the diameter of the core of each elementary blank used in the production of the multicore guide is approximately 3.

Preferably, with a view to a compatibility of said multicore guide with the standards at present in force, the matrix containing the elementary optical guides can also be inscribed in a cylinder with a diameter of 125 µm.

The external diameter of each elementary blank is then chosen in an appropriate manner, so that the drawing of the assembly of the elementary blanks leads to a guide which can be inscribed in said cylinder.

Various optimizations are possible for the multicore guides according to the invention. There can firstly be an optimization by a choice of the optogeometrical characteristics of the elementary optical guides (said characteristics being the diameter of the core of each elementary guide and the optical index difference between said core and the optical sheath surrounding it), said characteristics being different for two adjacent elementary guides. This differentiation makes it possible to bring these guides very close to one another whilst maintaining a perfectly acceptable crosstalk (e.g. 50 dB) at the wavelength of the light propagating in the elementary guides (e.g. 1.3 µm). There can also be an optimization by assuming that two adjacent elementary guides, which are sufficiently optically isolated from one another, are dedicated to two different light transmission directions, the distance to be taken into account for the crosstalk then becoming twice the spacing of two adjacent guides.

Thus, according to a special embodiment of the invention, each elementary optical guide has optogeometrical characteristics different from those of the elementary optical guides closest thereto, said characteristics being chosen so as to obtain a limited crosstalk between the elementary optical guides when the latter are traversed in the same direction by light having a given wavelength.

According to another embodiment complementary to the preceding embodiment, the elementary optical guides are optimized by their optogeometrical characteristics in order to reach an acceptable crosstalk (e.g. 50 dB) between adjacent guides, the use of two different transmission directions of two adjacent guides making it possible to further reduce the said distance.

Obviously, for each of these embodiments, with the parameters of a multicore guide being defined, the expert is able to define, particularly by homothetic transformation considerations, the parameters of the elementary blanks making it possible to obtain such a guide.

It is also possible to envisage an optimization of a multicore guide according to the invention by assuming that two adjacent elementary guides are allocated to lights of different wavelengths.

FIGS. 7 to 13 are diagrammatic cross-sectional views of monomode multicore guides according to the invention. The optical sheaths of the elementary optical guides are not shown in these drawings. All that is shown is the axis X of each elementary optical guide, the contour Y of each multicore guide and the cylinder C in which is inscribed said multicore guide. It is also possible to see the fictional flat or flats Z corresponding to the flats which have been formed on the elementary blanks (corresponding to the elementary guides) with a view to the assembly leading, after drawing, to the multicore guide. Each elementary guide a has a diameter 8 µm core and a diameter 24 µm optical sheath. Each cylinder C has in the examples of FIGS. 7 to 13 a diameter of 125 µm.

Thus, for each multicore guide shown, knowing the respective contours of the elementary preforms, whose assembly leads after drawing to said multicore guide (the contours E are homothetic of the preceding contours and associated with the elementary guides corresponding to the blanks shown in FIGS. 7 to 13), it is possible to determine the geometrical parameters of these elementary guides (radius r, distances h, $h_c$, $h_d$ between the axes of adjacent elementary guide cores) and determine, by homothetic considerations, the geometrical parameters of the elementary blanks.

FIG. 7 shows a multicore guide having two cores (reference is made to a two core configuration). A distance h between the two cores of e.g. 50 µm is chosen.

Figure 8:
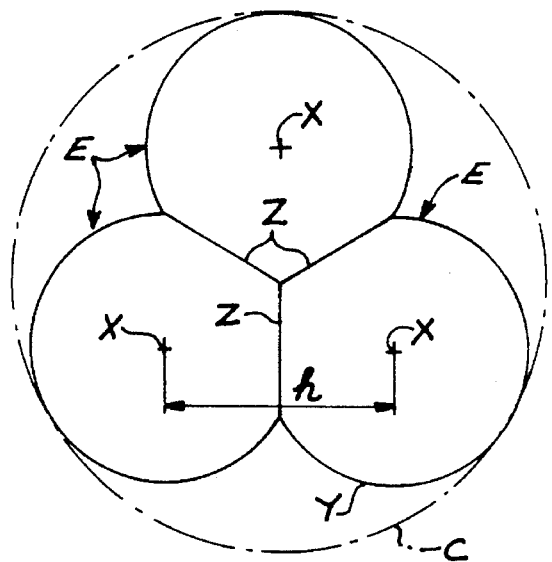

FIG. 8 shows a 3 core configuration, whose axes define an equilateral triangle, whose side h is 54.13 µm.

Figure 9:
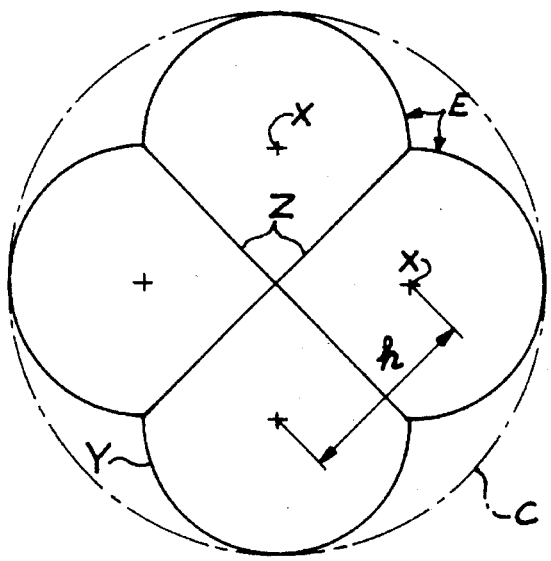

FIG. 9 shows a 4 core configuration, whose axes define a square of side h=44.19 µm, said value being compatible with a monomode guide profile (this also applies for the 2 or 3 core configurations).

Figure 10:
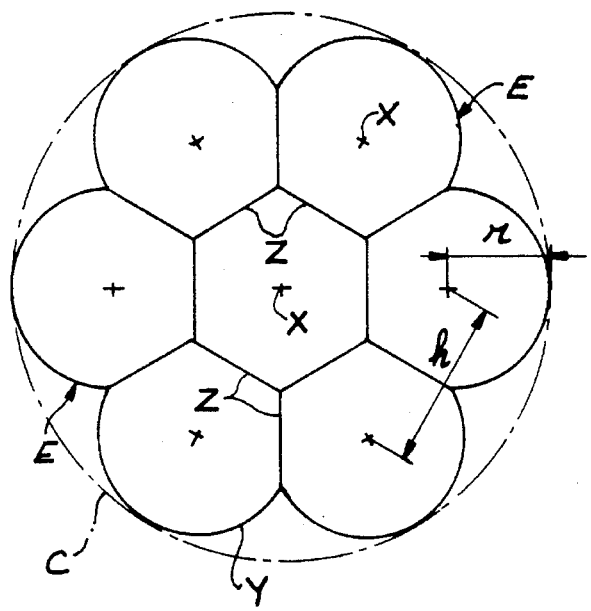

FIG. 10 shows a 7 core configuration, whose central elementary guide corresponds to an elementary blank with a hexagonal contour. For each of the 6 elementary guides surrounding the central elementary guide, a contour is obtained having a cylindrical portion of radius r=22.866 µm, which gives a distance h between two cores of 39.623 µm.

Figure 11:
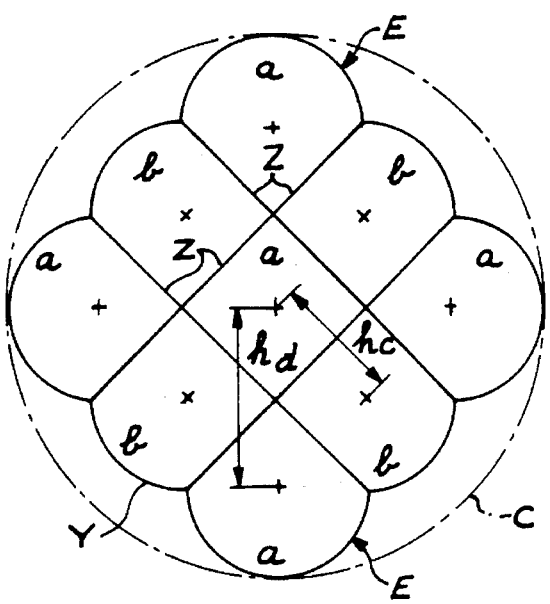

FIG. 11 shows a 9 core configuration, the spacing $h_c$ of said configuration (shortest distance between the cores) being 29.46 µm, whilst the distance $h_d$ from the central core to the cores furthest therefrom is 41.67 µm. In order to have a limited crosstalk, use is made of two types of optogeometrical characteristics designated a and b for the elementary guides and a type change takes place on passing from one elementary guide to one of its closest neighbours located at distance $h_c$ therefrom. The advantages of this 9 core configuration are that the cores form, in cross-section, a square matrix and it is sufficient to have two types a and b of optogeometrical characteristics in order to have a limited crosstalk.

Figure 12:
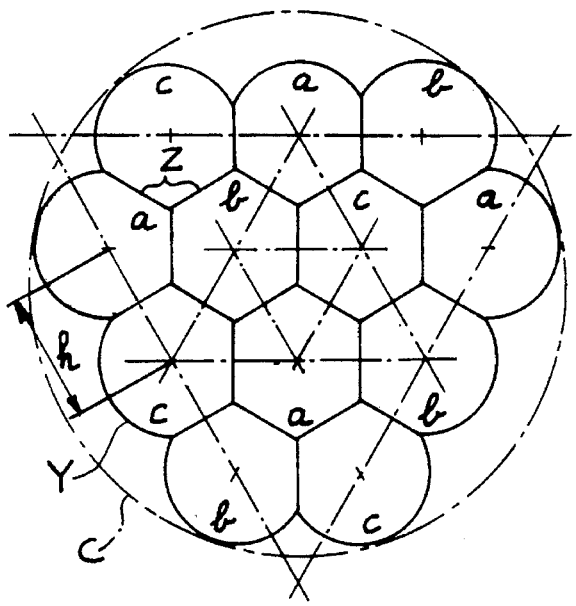

FIG. 12 shows a 12 core configuration forming a hexagonal network, where the cores are located at the apices of equilateral triangles of side h approximately 30 μm. This leads to a better filling factor of the circle C than with the 9 core configuration. To obtain a low crosstalk, it is possible to use three types a,b,c of optogeometrical characteristics for the elementary guides and said characteristics are alternated on passing from one elementary guide to the other, as can be seen in FIG. 12.

Figure 13:
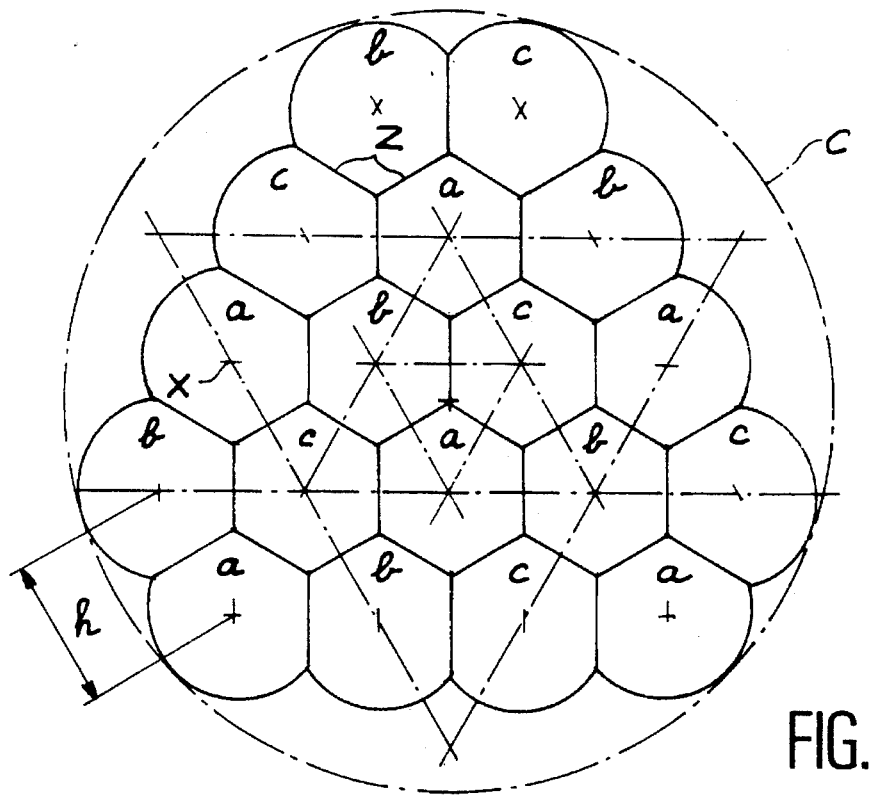

FIG. 13 shows a 18 core configuration, where the cores are once again located at the apices of equilateral triangles, whose side h is approximately 23 μm. In order to obtain a low crosstalk, use is once again made of three types a,b,c of optogeometrical characteristics for the elementary guides, which are alternated by passing from one elementary guide to the other, as can be seen in FIG. 13.

Figure 14:
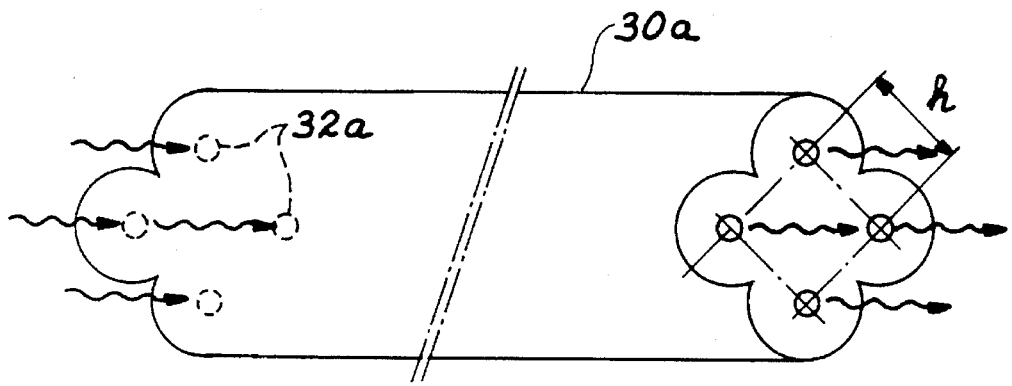
FIGS. 14A and 14B diagrammatically guides according to the invention, where two adjacent elementary guides are respectively dedicated to the same light transmission direction (FIG. 14A) and to different light transmission directions (FIG. 14B).
Figure 14:
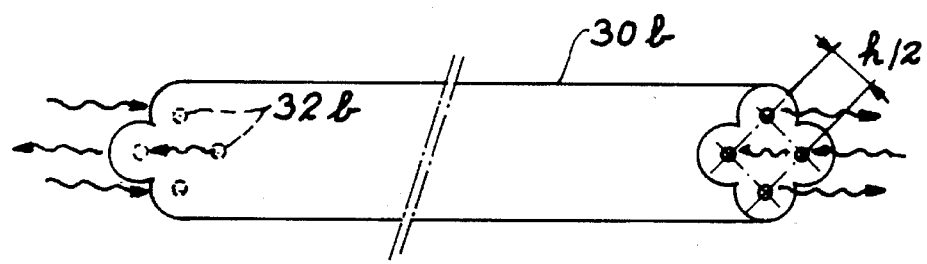

FIGS. 14A and 14B diagrammatically illustrate the possibility of reducing the dimensions of a multicore guide according to the invention, whilst maintaining the same crosstalk, provided that a choice is made of appropriate propagation directions for the light in the elementary guides of the multicore guide. FIG. 14A shows a multicore guide 30a, where all the elementary guides 32a, which are spaced by h from one another, are traversed by said light in the same direction. FIG. 14B shows another multicore guide 30b, where all the elementary guides 32b are spaced from one another by h/2 and which leads to the same crosstalk as the guide of FIG. 14A, provided that two adjacent guides are traversed by light in opposite directions.

We claim:

1. Multicore optical guide, comprising:
    a plurality of elementary optical guides (G1 to G4), each having a core (c1 to c4) and an optical sheath (g1 to g4) surrounding said core, longitudinal axes (X1 to X4) of said cores being substantially parallel and
    a matrix (M) containing said elementary optical guides, said matrix defining a symmetrical geometric figure and a plurality of joined matrix cylinders
    said elementary optical guides (G1 to G4) being positioned within about 1 micron of points of symmetry of the figure and within about 1 micron of axes of corresponding matrix cylinders, core diameters and diameters of the optical sheaths of said elementary guides having precisions of about one micron and an offset distance between said core axis and said longitudinal sheath axis being approximately 1/10 micron.

2. Optical guide according to claim 1, wherein there are four elementary optical guides (G1 to G4), whose core axes (X1 to X4) form, in cross-section, corners of a square and the outer contours of the matrix form four identical portions of cylinders of revolution (6, 7, 8, 9), whose axes respectively coincide with the axes of the elementary optical guides.

3. Optical guide according to claim 1, characterized in that each elementary optical guide is monomodal.

4. Optical guide according to claim 1, characterized in that a ratio of the diameter of the optical sheath to the diameter of the core of each elementary optical guide is approximately 3.

5. Optical guide according to claim 4, characterized in that the matrix in which are located the elementary optical guides can be inscribed in a cylinder with a diameter of 125 μm.

6. Optical guide according to claim 1, characterized in that each elementary optical guide has optogeometrical characteristics different from those of the elementary optical guides closest thereto, said characteristics being such as to obtain a crosstalk of about 50 dB or better between the elementary optical guides when the guides are traversed in the same direction by light having a given wavelength.

7. Process for the production of a multicore optical guide according to claim 1, said process comprising the following successive steps:
    producing a plurality of elementary blanks (16, 17, 18, 19) for manufacturing the multicore guide, machining said elementary blanks, assembling these blanks into a geometrical model for the multicore optical guide, partly welding the thus machined and assembled elementary blanks to a drawing starter (25) and
    drawing the elementary blanks provided with the drawing starter in order to obtain the multicore optical guide.

8. Process according to claim 7, characterized in that each elementary blank (16, 17, 18, 19) is produced in accordance with a process involving the following successive steps:
    producing a hollow silica bar having a wall and a geometrical precision,
    depositing a vitreous coating in said bar by internal vapor phase deposition in a furnace, using a mixture of gaseous compounds which circulate in said bar, said compounds producing the coating by reacting with one another and
    collapsing the bar.

9. Process according to claim 7, characterized in that the machining of each elementary blank (16,17,18,19) comprises forming thereon one or more flats (23) parallel to the axis of the elementary blank, for assembly of the elementary blanks in accordance with the geometrical model.

10. Process according to claim 9, wherein four identical elementary blanks (16, 17, 18, 19) are produced, each having two identical, perpendicular flats (23), which have a common straight line (D) and which delimit a portion of a cylinder of revolution (P) around the axis of said elementary blank, in such a way that the latter admits a plane of symmetry containing the axis of said elementary blank and the line (D) common to the two flats and wherein the four, thus machined, elementary blanks are assembled to obtain an assembly in which the four axes of the elementary blanks define, in cross-section, corners of a square and whose contours form four portions of cylinders of revolution (P), whose axes respectively coincide with the axes of the elementary blanks.

11. Process according to claim 7, characterized in that a ratio of the diameter of the optical sheath to the diameter of the core of each elementary blank is approximately 3.

12. Process according to claim 11, characterized in that the external diameter of each elementary blank is such that the multicore guide obtained by drawing the assembly of the elementary blanks can be inscribed in a cylinder of diameter 125 μm.

13. Process according to claim 7, characterized in that the assembly is provided with a protective coating (28) during its drawing.

14. Process according to claim 13, characterized in that the protective coating (28) is also provided with a means (29) for marking the elementary optical guides (27) of the multicore guide formed.

* * * * *